(12) United States Patent
Znamenacek et al.

(10) Patent No.: US 12,669,205 B2
(45) Date of Patent: Jun. 30, 2026

(54) FLOW REGULATOR ASSEMBLY FOR DRILLING OPERATIONS

(71) Applicants: Mitchell Znamenacek, Lincoln, NE (US); Charles Barber, Lincoln, NE (US)

(72) Inventors: Mitchell Znamenacek, Lincoln, NE (US); Charles Barber, Lincoln, NE (US)

( * ) Notice: Subject to any disclaimer, the term of this patent is extended or adjusted under 35 U.S.C. 154(b) by 40 days.

(21) Appl. No.: 18/131,253

(22) Filed: Apr. 5, 2023

(65) Prior Publication Data

US 2024/0337342 A1     Oct. 10, 2024

(51) Int. Cl.
*F16L 41/06*     (2006.01)

(52) U.S. Cl.
CPC ......... *F16L 41/06* (2013.01); *Y10T 137/6123* (2015.04)

(58) Field of Classification Search
CPC ........ E21B 34/12; E21B 34/125; E21B 34/14; F16L 41/045; F16L 41/06; F16L 41/065; F16L 55/105; Y10T 137/612; Y10T 137/6123; Y10T 137/613; Y10T 137/6137; F16K 31/12
USPC ........ 137/317, 318, 322, 320; 251/326, 327, 251/329
See application file for complete search history.

(56) References Cited

U.S. PATENT DOCUMENTS

| | | | | |
|---|---|---|---|---|
| 592,007 | A | * | 10/1897 | Howe ..................... F16L 41/06 |
| | | | | 408/137 |
| 936,618 | A | * | 10/1909 | Ford ..................... F16L 41/06 |
| | | | | 137/318 |
| 1,294,052 | A | * | 2/1919 | Clark ................... B67D 1/0835 |
| | | | | 137/320 |
| 1,701,691 | A | * | 2/1929 | Mueller ................. F16L 41/06 |
| | | | | 138/92 |
| 2,291,979 | A | * | 8/1942 | Mueller ................. F16L 41/06 |
| | | | | 408/72 R |
| 2,296,651 | A | * | 9/1942 | Mueller ................. F16L 41/06 |
| | | | | 408/111 |
| 2,299,843 | A | * | 10/1942 | Mueller ................. F16L 41/06 |
| | | | | 408/137 |
| 2,314,013 | A | * | 3/1943 | Mueller ................. F16L 41/06 |
| | | | | 408/239 R |

(Continued)

FOREIGN PATENT DOCUMENTS

| | | | | |
|---|---|---|---|---|
| CH | 685835 | A5 | * 10/1995 | .............. F16L 41/06 |
| GB | 760622 | A | * 11/1956 | .............. F16L 41/04 |

*Primary Examiner* — Kenneth Rinehart
*Assistant Examiner* — Jonathan J. Waddy
(74) *Attorney, Agent, or Firm* — Armstrong Teasdale LLP

(57) ABSTRACT

A flow regulator assembly for regulating a fluid contained within a shell. The shell having an exterior surface and a cavity storing a fluid. The flow regulator assembly includes a body and an inner surface defining a main passage, the main passage is sized to receive a tool configured to form an opening, a connector assembly for connecting the body to the shell, and a flow control device that is selectively positionable, relative to the body, in at least one of an open position, a closed position, and a partially open position. When in the open position the fluid may move through the main passage, in the closed position the fluid is blocked from moving through the main passage, and in the partially open position at least a portion of the main passage is blocked while the tool is disposed within the main passage.

14 Claims, 14 Drawing Sheets

(56)         References Cited

U.S. PATENT DOCUMENTS

| | | | | | |
|---|---|---|---|---|---|
| 2,314,014 | A | * | 3/1943 | Mueller | F16L 41/06 |
| | | | | | 408/72 R |
| 2,318,321 | A | * | 5/1943 | Mueller | F16L 41/06 |
| | | | | | 137/318 |
| 2,745,669 | A | * | 5/1956 | Mueller | F16L 41/06 |
| | | | | | 279/91 |
| 2,756,486 | A | * | 7/1956 | Smith | F16L 41/04 |
| | | | | | 29/890.11 |
| 2,761,688 | A | * | 9/1956 | Mueller | F16L 41/06 |
| | | | | | 408/110 |
| 2,767,600 | A | * | 10/1956 | Mueller | F16L 41/06 |
| | | | | | 137/318 |
| 2,790,652 | A | * | 4/1957 | Risley | F16L 25/028 |
| | | | | | 285/55 |
| 2,838,965 | A | * | 6/1958 | Mueller | F16L 41/06 |
| | | | | | 408/72 R |
| 2,870,629 | A | * | 1/1959 | Willis | G01N 17/00 |
| | | | | | 29/213.1 |
| 2,966,814 | A | * | 1/1961 | Mueller | F16L 41/06 |
| | | | | | 408/239 R |
| 2,986,958 | A | * | 6/1961 | Mueller | F16L 41/06 |
| | | | | | 408/139 |
| 3,087,358 | A | * | 4/1963 | Smith | F16L 41/06 |
| | | | | | 74/89.45 |
| 3,209,776 | A | * | 10/1965 | Pearse | F16K 3/184 |
| | | | | | 251/329 |
| 3,533,424 | A | * | 10/1970 | Wedge | F16K 3/00 |
| | | | | | 137/15.13 |
| 3,756,261 | A | * | 9/1973 | Minchhoff | F16L 41/06 |
| | | | | | 29/523 |
| 3,983,897 | A | * | 10/1976 | Gebelius | F16L 29/007 |
| | | | | | 137/67 |
| 4,177,827 | A | * | 12/1979 | Smith | F16L 55/105 |
| | | | | | 137/340 |
| 4,506,865 | A | * | 3/1985 | Bragin | F16K 3/02 |
| | | | | | 251/366 |
| 5,030,039 | A | * | 7/1991 | Dove | F16L 41/04 |
| | | | | | 408/72 R |
| 5,560,388 | A | * | 10/1996 | Caldwell | F16L 41/06 |
| | | | | | 138/94 |
| 9,200,740 | B2 | | 12/2015 | Leto | |
| 2001/0017159 | A1 | * | 8/2001 | Sato | F16L 41/04 |
| | | | | | 137/318 |
| 2007/0006929 | A1 | * | 1/2007 | Wolk | F16L 21/005 |
| | | | | | 138/90 |

* cited by examiner

126

136

172

126

136

172

126

136

172

FLOW REGULATOR ASSEMBLY FOR DRILLING OPERATIONS

FIELD

The field of the disclosure relates generally to assemblies and systems for regulating the flow of fluid from a shell, and more particularly, to assemblies and systems for regulating the flow of a fluid draining from a pipe after a drilling operation.

BACKGROUND

Construction, remodeling, repair, and demolition of buildings, and/or other structures, involve procedures which aim to efficiently, and safely, construct, dismantle, repair, and/or rebuild components of the building. At least some procedures require draining fluids, e.g., water, refrigerant, etc., from one or more pipes and/or conduits within the building prior to, during, or after the construction application. Conventionally, fluid is drained from a pipe by drilling an opening through a wall of the pipe and allowing the fluid contained within the pipe to drain therefrom. The fluid flows continuously and uncontrolled through the opening. Also, sometimes a pipe and/or conduit is accidentally punctured, e.g., during demolition and/or a construction operation, and it may be difficult to control the flow of fluid exiting the pipe through the puncture. During some other procedures, it may be necessary to collect a sample of fluid contained within a pipe or conduit, e.g., for evaluation purposes. Furthermore, during some other known procedures, it may be necessary to install pressure measuring devices, such as gauges or flow meters, e.g., a venturi flow meter, onto a pipe or conduit.

As the fluid drains from the pipe, the fluid may flow to unwanted locations, damage components of the building, and/or present a safety risk to people in the area. Accordingly, the fluid that is drained from a pipe may be collected by a container, e.g., a bucket. For example, a container may be placed approximately below or adjacent the drilled opening to attempt to collect at least some of the fluid as the fluid drains from the pipe. In some cases, it may be challenging to collect the flow of fluid exiting through the drilled opening because the flow may vary in speed, direction, and force depending on the amount of the fluid in the pipe and environmental conditions. In some cases, the pipe may be positioned at an elevated location and/or obscured behind walls making it difficult to perform the drilling operation and/or position a container to collect the draining fluid. Moreover, the container may fill up before the pipe is drained and/or the container may not be properly positioned to collect all the fluid when the pipe is punctured.

Accordingly, a need exists for an assembly for controlling the flow of fluid draining from an opening of a pipe.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect a flow regulator assembly for controlling a fluid contained within a shell is provided. The flow regulator assembly includes a body, a connector assembly, and a flow control device. The body includes an inner surface defining a main passage. The main passage may be sized to receive a tool to form an opening. The body is arranged such that the tool extends through the main passage and engages the exterior surface of the shell. The connector assembly is connectable to the body to the shell. The flow control device is selectively positionable, relative to the body, in at least one of an open position, a closed position, or a partially open position. In the open position the fluid moves through the main passage, in the closed position the fluid is blocked from moving through the main passage, and wherein when the flow control device is in the partially open position at least a portion of the main passage is blocked while the tool is disposed within the main passage.

In another aspect a flow regulation system is provided. The flow regulation system includes a tool for forming an opening in a shell. The flow regulation system includes an inner surface defining a main passage extending along an axial direction. The main passage sized to receive a tool configured to form an opening. The body is arranged such that the tool extends through the main passage along the axial direction and engages the exterior surface of the shell and a flow may move through the main passage along the axial direction.

In yet another aspect, a method of regulating fluid contained within a shell is disclosed. The method may include connecting a flow regulator assembly to the shell. The flow regulator assembly includes a shell having an inner surface defining a main passage and a flow control device disposed at least partially within the main passage. The flow control device may be positionable in at least one of a closed position, an open position, or partially open position. The method includes positioning the flow control device in the open position.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

When introducing elements of the present disclosure or the embodiment(s) thereof, the articles "a," "an," "the," and "said" are intended to mean that there are one or more of the elements. The terms "comprising," "including," "containing" and "having" are intended to be inclusive and mean that there may be additional elements other than the listed elements. The use of terms indicating a particular orientation (e.g., "top," "bottom," "side," etc.) is for convenience of description and does not require any particular orientation of the item described.

Figure 1:
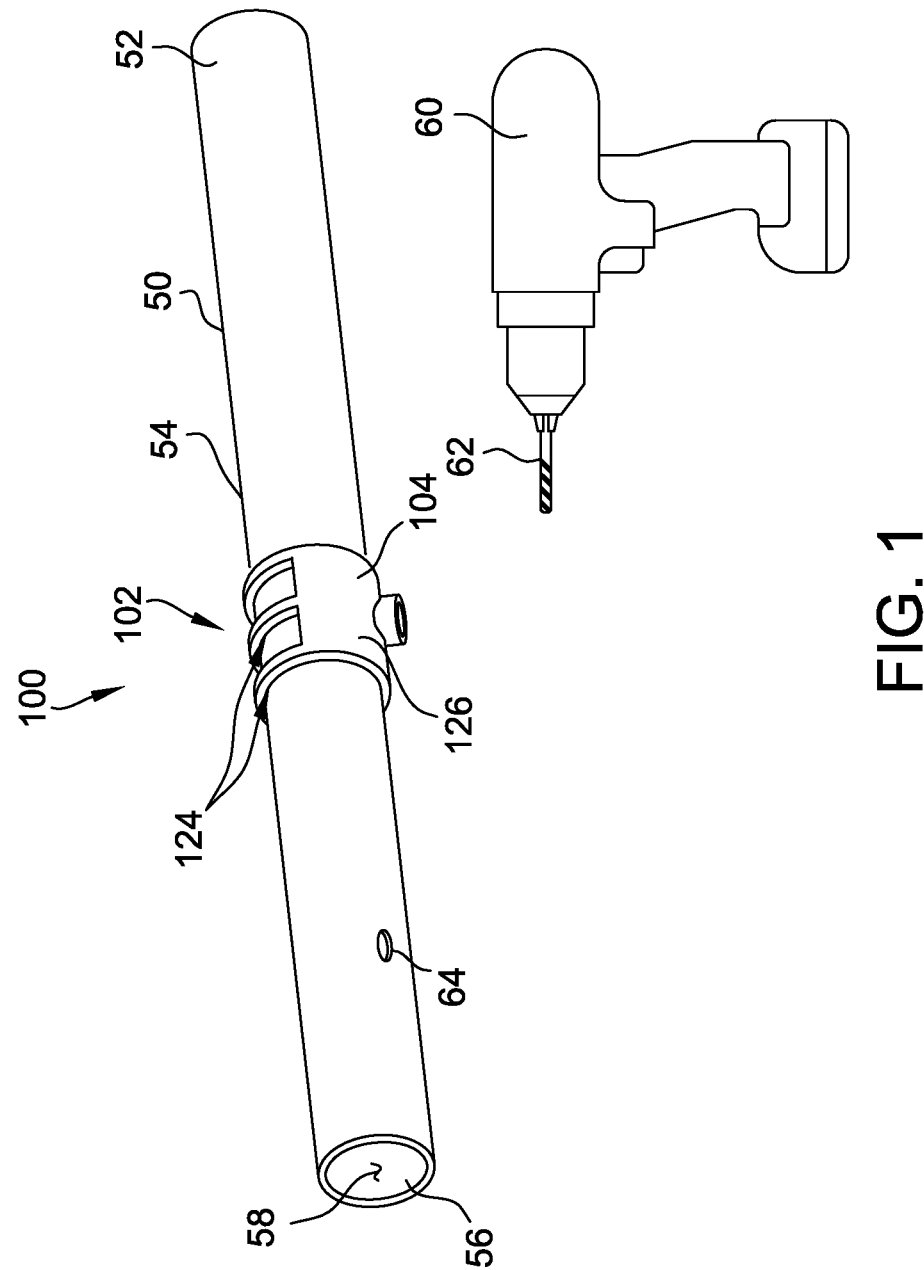
FIG. 1 is a schematic illustration of a flow regulation system for draining a pipe using one embodiment of a flow regulator assembly.

In reference to FIG. 1, a flow regulation system 100 is provided for regulating fluid flow (e.g., liquid and/or a gas), draining, partially draining, and/or expulsion of fluid from within a shell structure having a cavity which may contain a fluid, e.g., a pipe 50. The pipe 50 may include a shell 52 having an exterior surface 54 and an inner surface 56 defining a cavity 58 that may contain a fluid. A tool 62 may be used to form a shell opening 64. For example, a drill 60 operably connected to a tool 62, e.g., drill bit, may be used to drill an opening through the shell 52, creating one or more of a shell opening 64 through which fluids contained within the cavity 58 may be drained. The shell opening 64 may be formed using any suitable tool, e.g., a drill bit attached hand drill, any rotary drill, a pipe cutter, a punch, a needle, etc.

In the example, the flow regulation system 100 includes a flow regulator assembly, generally indicated at 102, for controlling a flow of fluid that exits the pipe 50 through the shell opening 64 formed through the shell 52. The flow regulator assembly 102 controls the flow of fluid draining from the shell opening 64, allowing an operator to prepare for the collection and/or disposal of the fluid. For example, the flow regulator assembly 102 may block the flow of fluid draining from the pipe 50, allowing an operator to prepare for the collection of the fluid exiting the pipe 50 through shell opening 64, e.g., placing a collection device, e.g., a bucket, and/or attaching a hose to the flow regulator assembly 102 to direct the fluid to another location. In the example, the flow regulator assembly 102 is aligned with the shell opening 64 such that the flow regulator assembly 102 may receive the fluid, accordingly, the flow regulator assembly 102 visibly blocks the view of the shell opening 64. FIG. 1 shows the flow regulator assembly 102 displaced from the shell opening 64, for illustrative purposes.

In some embodiments, the flow regulator assembly 102 may be customizable having one or more features and/or components that may be selected based on size and shape that is best suited to drain fluids from various shapes and/or sizes of shells, e.g., pipes, conduits, ducts, tubes, and/or any other shell structures including a cavity that may contain a fluid, having various shapes, e.g., cylindrical, spherical, or rectangular, and/or having various dimensions, e.g., ranges of diameters and/or widths. The flow regulator assembly 102 may be described herein in the context of facilitating controlling fluid draining from a cylindrical pipe 50 having a cylindrical exterior surface, however, the flow regulator assembly 102 is not limited for use with only cylindrical pipes.

Figure 2:
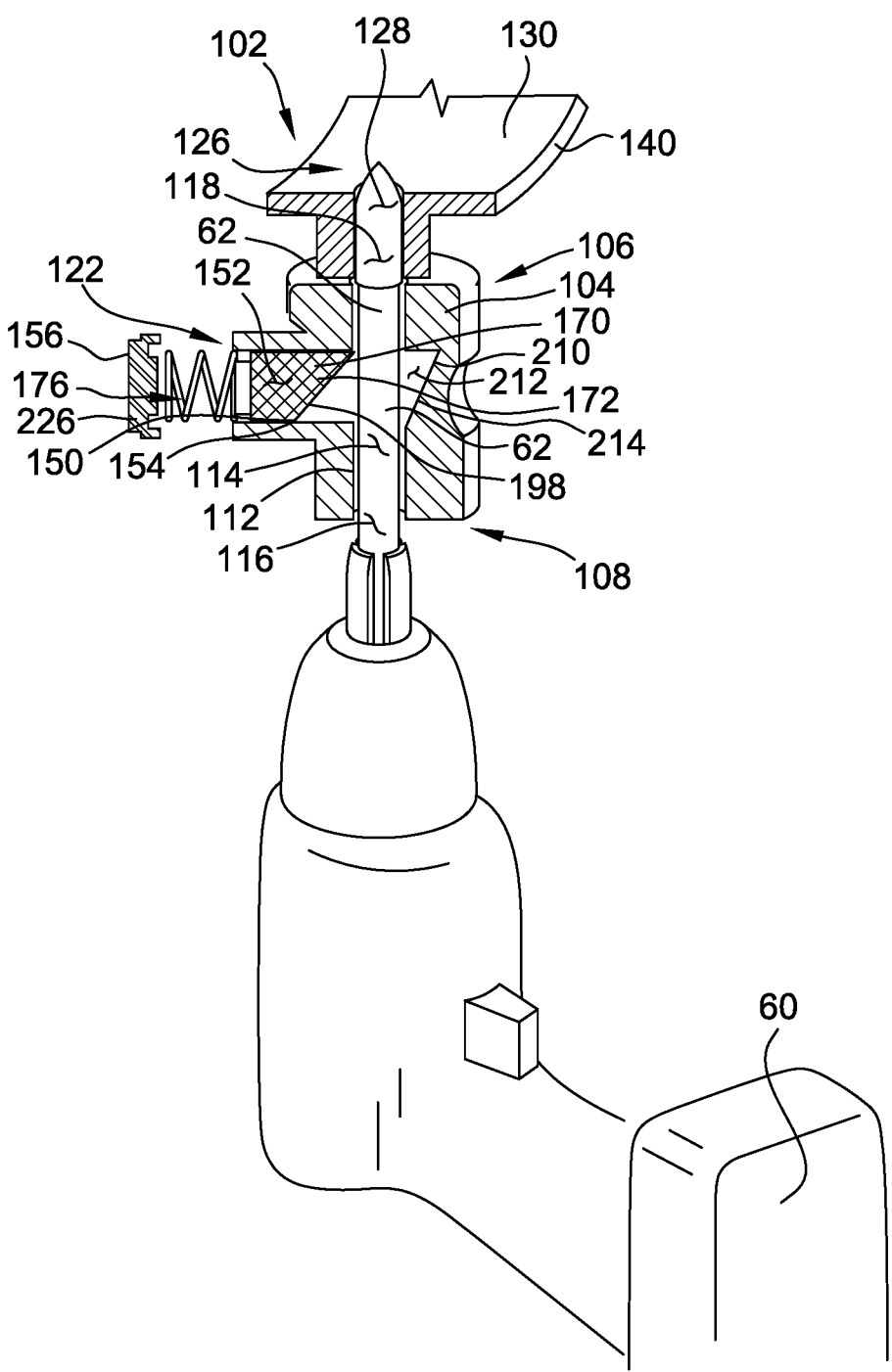
FIG. 2 is a cross-sectional view of an embodiment of a flow regulator assembly for use with the flow regulation system shown in FIG. 1 with a flow control device shown in an open position.
Figure 3A:
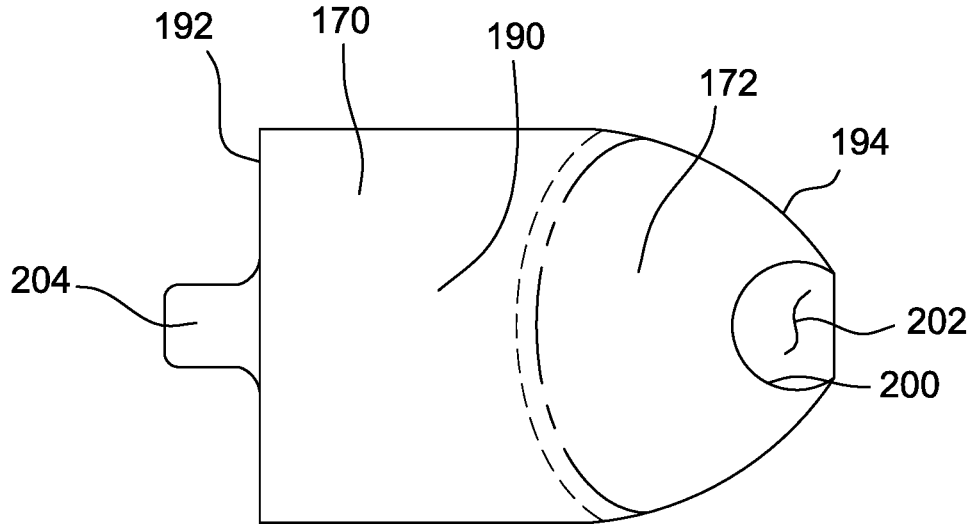
FIG. 3A is a detailed top view of a plunger for use with the flow regulator assembly shown in FIG. 2.
Figure 3B:
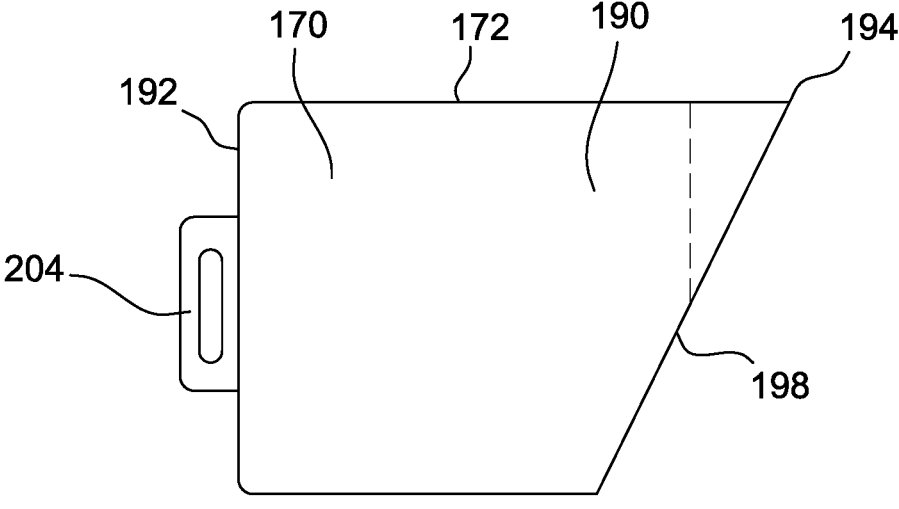
FIG. 3B is a detailed side view of the plunger shown in FIG. 3A.

FIG. 2 is a cross-sectional view of an example of the flow regulator assembly 102. The flow regulator assembly 102 includes a body 104 having a pipe end 106 and an opposing drill end 108 that is axially spaced from the pipe end 106. The flow regulator assembly 102 includes a first inner surface 112 defining one or more passages, including a main passage 114 extending through the body 104 between a first opening 116 defined in the drill end 108 and a second opening 118 defined in the pipe end 106, generally along an axial direction. The main passage 114 may receive fluid draining from the shell opening 64 through the second opening in the pipe end 106. The flow regulator assembly 102 also includes a flow control device 122, disposed between the first opening 116 and the second opening 118, for controlling the flow of fluid through the main passage 114. The flow regulator assembly 102 may include a connector assembly 124 for connecting the flow regulator assembly 102 to the pipe 50. The flow regulator assembly 102 may include an interface assembly 126 that defines an interface opening 128, generally aligned with the second opening 118 and including one or more contact surfaces 130 for contacting the pipe 50 when the flow regulator assembly 102 is connected to the pipe 50.

In embodiments described herein a drilling operation may be performed after the flow regulator assembly 102 has been suitably positioned and connected to the pipe 50. The flow regulator assembly 102 may be connected to the pipe 50, e.g., using the connector assembly 124, and the interface opening 128 in the interface assembly 126, and/or the second opening 118, is aligned with an intended location of the shell opening 64. The interface opening 128, the first and second openings 116, 118, and/or the main passage 114 may be sized and shaped such that the tool 62, and/or a portion of the drill 60, or any other suitable tool used to form shell opening 64, may be passed through the openings 116, 118, 128, and/or the main passage 114 such that the drill 60 may drill the shell opening 64 in the pipe 50 while the flow regulator assembly 102 is connected to the pipe 50. The inner surface 112 may guide the movement of the tool 62, as the tool 62 is passed through the main passage 114. Accordingly, the flow regulator assembly 102 is connected to the pipe 50 during the drilling operation, such that an operator does not have to hold the flow regulator assembly 102 in place, while also performing the drilling operation.

The interface assembly 126 may be connected to the body 104, e.g., at the pipe end 106 of the body 104. In some other embodiments, the interface assembly 126 is formed integrally with the body 104. In some embodiments, the interface assembly 126 may be selectively connected, or disconnected, to the body 104, such that the interface assembly 126 is removable and/or replaceable. When the interface assembly 126 is connected to the body 104, the interface opening 128 defined by the interface assembly 126, may be generally aligned with the second opening 118 and/or the main passage 114. The contact surface 130 of the interface assembly 126 may be shaped complementary to the exterior surface 54 of the pipe 50. The interface assembly 126 may have various configurations, e.g., the contact surface 130 may have various shapes and/or sizes, such that an operator may select a suitable interface assembly 126 to be used with various shapes and sizes of pipe 50. For example, interface assembly 126 may include various sizes, and/or radius of curvatures, for connecting to various sizes of pipes 50.

In some embodiments, the interface assembly 126 includes a saddle 140 and/or a gasket 142. The saddle 140 and the gasket 142 may be formed integrally as a single piece and/or formed separately and connected using a suitable connection mechanism, e.g., adhesives and/or clips. The gasket 142 includes the contact surface 130 which contacts at least a portion of the pipe 50 when the flow regulator assembly 102 is connected to the pipe 50. For example, when the flow regulator assembly 102 is connected to the pipe 50, the gasket 142 is disposed between the saddle 140 and the pipe 50 forming a seal between the pipe 50 and the saddle 140, preventing fluid from leaking between the gasket 142 and the exterior surface 54 of the pipe 50. The saddle 140 and/or the gasket 142 may be shaped complementary to the exterior surface of the pipe 50. For example, the saddle 140 and/or the gasket 142 may have a radius of curvature similar to a radius of curvature of the exterior surface of the pipe 50. Alternatively, only the gasket 142 is shaped complementary to the exterior surface 54 of the pipe 50. In some embodiments, the gasket 142 may be formed of a material having elastic properties, e.g., a rubber substance. For example, the gasket 142 may be flexible, such that the gasket 142 may change shape to conform to the exterior surface 54 of the pipe 50. In some embodiments, the saddle 140 may be formed of a material that is different than the material of the gasket 142, for example, a metal and/or a hardened plastic. Additionally, and/or alternatively, the saddle 140 and/or the gasket 142 may be any shape or size enabling the flow regulator assembly 102 to function as described herein.

In some embodiments, the interface assembly 126, e.g., the saddle 140 and the gasket 142, may have a contact surface 130 that is generally planar, for contacting one or more flat surfaces of a square pipe or conduit, for example.

In some embodiments, the interface assembly 126 includes a neck 136 that may be used to connect the interface assembly 126 to the body 104. See FIG. 4 and FIG. 7. The neck 136 may extend through the second opening 118 such that the neck 136 extends at least partially into the main passage 114. In some embodiments, the neck 136 may include external threads 138 for engaging with internal threads 139 formed on the first inner surface 112 defining the main passage 114. In the embodiments illustrated herein, the saddle 140 includes the neck 136 extending therefrom. In some alternative embodiments, the gasket 142 includes the neck 136.

The one or more connector assemblies 124 may be used to selectively connect or disconnect the body 104 and/or the interface assembly 126 to the pipe 50. The connector assembly 124 may include a first end 145 that is connected to the body 104, and/or the interface assembly 126, and a second end 147 that extends from the first end 145, that may be selectively engaged with the pipe 50. For example, the second end 147 may be wrapped around the pipe 50. In some embodiments, the first end 145 of the connector assembly 124 may be connected or formed integrally with the body 104 and/or the interface assembly 126, e.g., using welding, brazing, and/or adhesive. In some other embodiments, the first end 145 of the connector assembly 124 may be selectively connected to the body 104 and/or the interface assembly 126.

Figure 7:
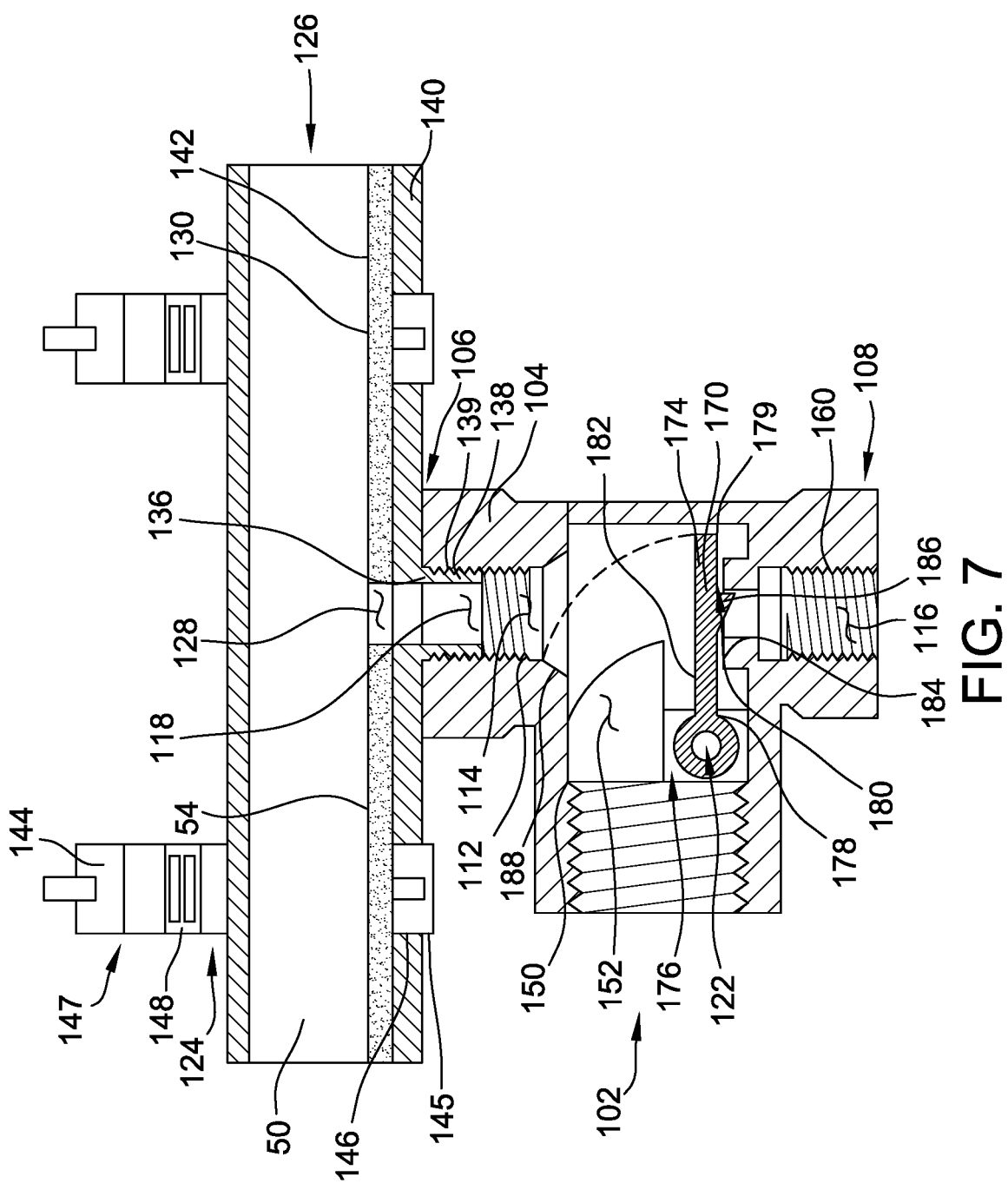
FIG. 7 is a cross-sectional view of another embodiment of a flow regulator assembly for use with the flow regulation system shown in FIG. 1 with a flow control device shown in a closed position.

In reference to FIG. 7, the second end 147 may include a first fastener 144, e.g., clips, screws, and/or a buckle, which is connectable to a corresponding mating fastener 146 disposed on the second end 147. For example, the connector assembly 124 may extend around the circumference of the pipe 50 and the first fastener 144 may be selectively connected to the mating fastener 146. The mating fastener 146 may be positioned at any suitable location, e.g., the first end 145 of the connector assembly 124, the body 104, and/or the interface assembly 126. In some embodiments, the connector assembly 124 includes one or more clamps, e.g., a hose clamp, ring clamps, and/or a pipe clamp. In some embodiments, the connector assembly is a flexible structure that may be wrapped around the pipe 50, e.g., a strap and/or a belt. In some embodiments, the connector assembly includes a pair of opposing grips that may be pressed against the pipe 50, clamping the pipe 50 between the grips. Additionally, and/or alternatively, the fastener 144 may include any suitable fasteners, adjustable mechanisms, and/or adhesives, which may be used to selectively connect or disconnect the body 104 and/or the interface assembly 126 to the pipe 50.

Figure 10:
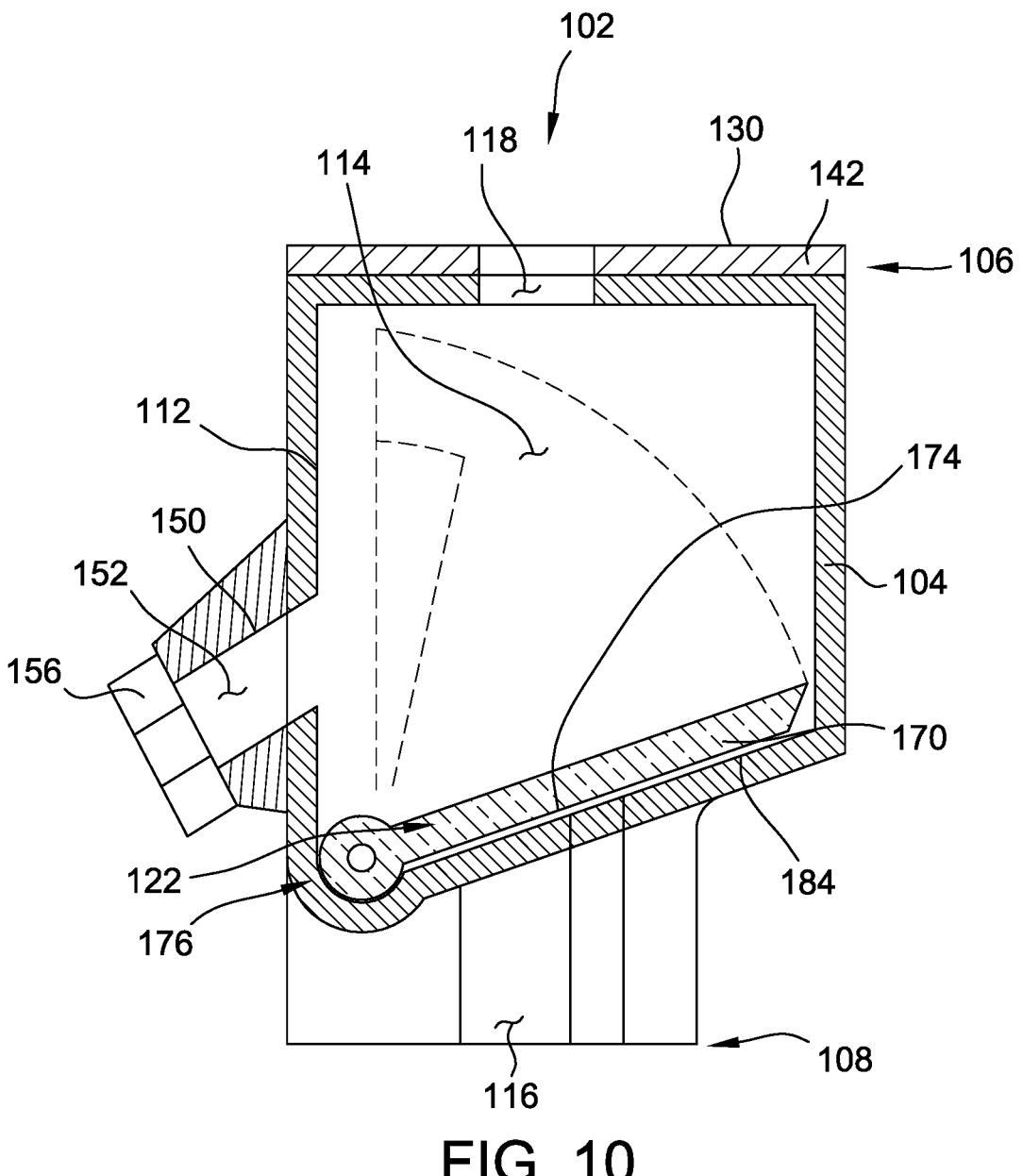
FIG. 10 is a cross-sectional view of another embodiment of a flow regulator assembly for use with the flow regulation system shown in FIG. 1 with a flow control device shown in a closed position.
Figure 11:
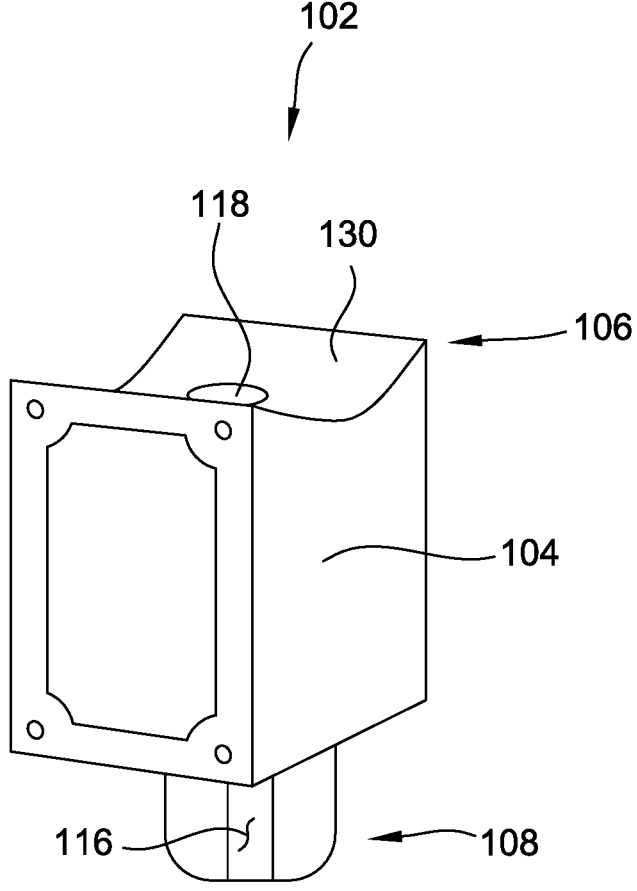
FIG. 11 is a perspective view of another embodiment of a flow regulator assembly for use with the flow regulation system shown in FIG. 1.
Figure 12:
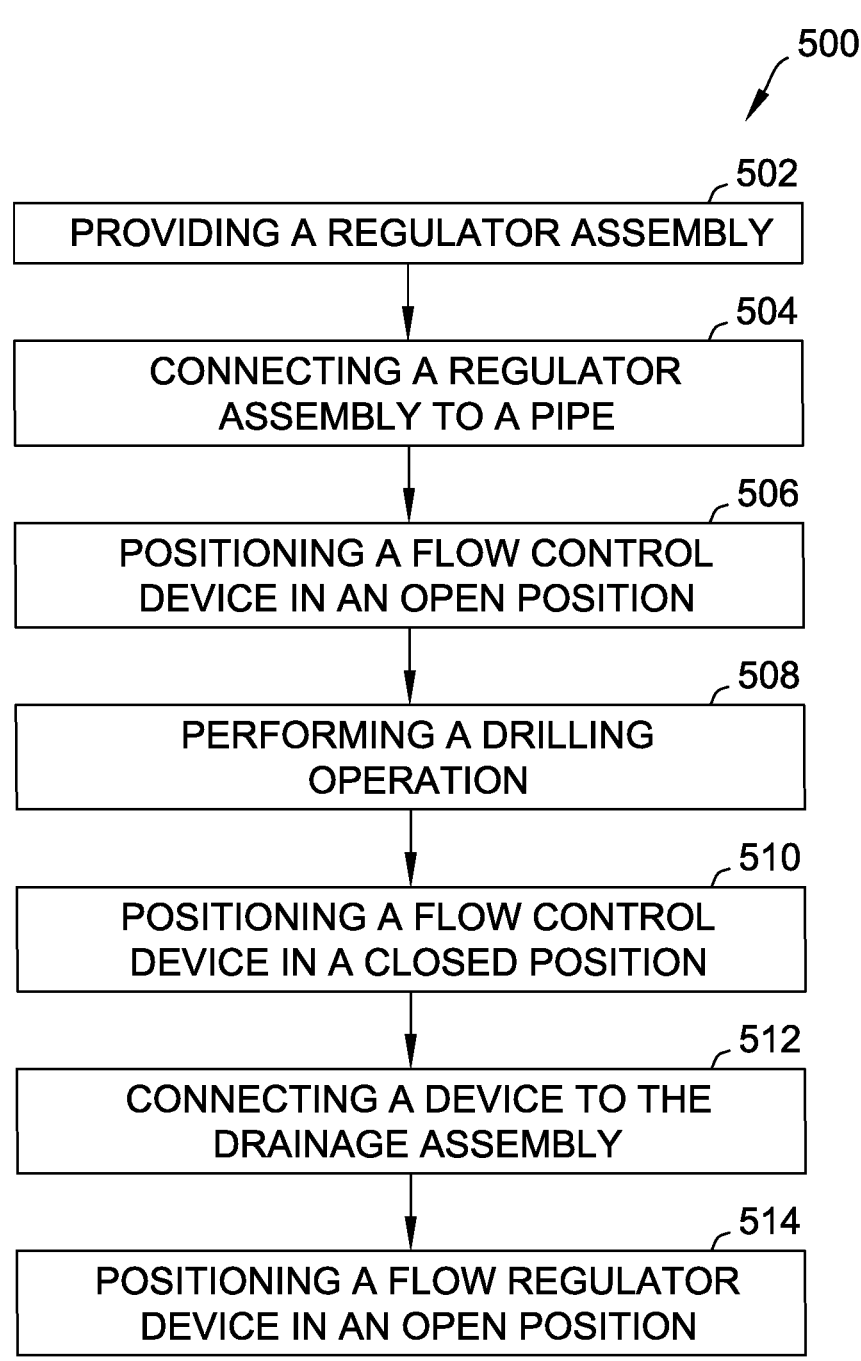
FIG. 12 is a flowchart of a method of performing a draining operation.

The connector assembly 124 may include one or more adjustable mechanisms 148, such that the connector assembly 124 may have an adjustable length. The adjustable mechanism 148 may include a buckle, a threaded set screw on a worm gear hose clamp, a T-bolt on a hose clamp, for example. The adjustable mechanism 148 may include any suitable mechanism that may be used to selectively tighten and/or loosen the connector assembly 124. The connector assembly 124 may be adjustable to selectively tighten, and/or loosen, the connector assembly 124 in engagement with the pipe 50. The connector assembly 124 selectively connects the body 104 and the interface assembly 126 with the pipe 50 and presses the contact surface 130 with the exterior surface 54 of the pipe 50. In some embodiments, tightening, using the adjustable mechanism 148, the connector assembly 124 about the pipe 50, may press the contact surface 130 of the gasket 142 between the saddle 140 and the exterior surface of the pipe 50, such that the gasket 142 forms a seal between the flow regulator assembly 102 and the pipe 50. In some embodiments, the gasket 142 is connected to the shell, e.g., at and/or near the pipe end 106. See FIG. 10. For example, the gasket 142 may be adhered to a surface of the body 104. In some embodiments, the shell may include the contact surface 130. See FIG. 11. For example, the body 104 may include one or more contacting surfaces 130 that are shaped complementary to the exterior surface 54 of the pipe 50.

In some embodiments, the flow regulator assembly 102 includes one or more second inner surfaces 150 that define one or more secondary passages 152 defined by the body 104. The secondary passage 152 may connect to the main passage 114. The secondary passage 152 may include internal and/or external threads 154 which enable the flow regulator assembly 102 to be threadably engaged with a device 161, e.g., a hose, a pump, a flow measuring device, a temperature sensor, a pressure sensor, etc. In some embodiments, the device 161 may be formed integrally with the flow regulator assembly 102. In some embodiments, the secondary passage 152 may be arranged generally perpendicular to the main passage 114. In some other embodiments, the secondary passage 152 is arranged at an angle relative to the main passage 114. See FIG. 10. The flow regulator assembly 102 may include a cap 156 that may be used to close and/or seal the secondary passage 152. For example, the cap 156 may include threads that may be threadably engaged with the threads 154 of the secondary passage 152. In another example, the cap 156 may be press fit over, and/or into the secondary passage 152.

Figure 8:
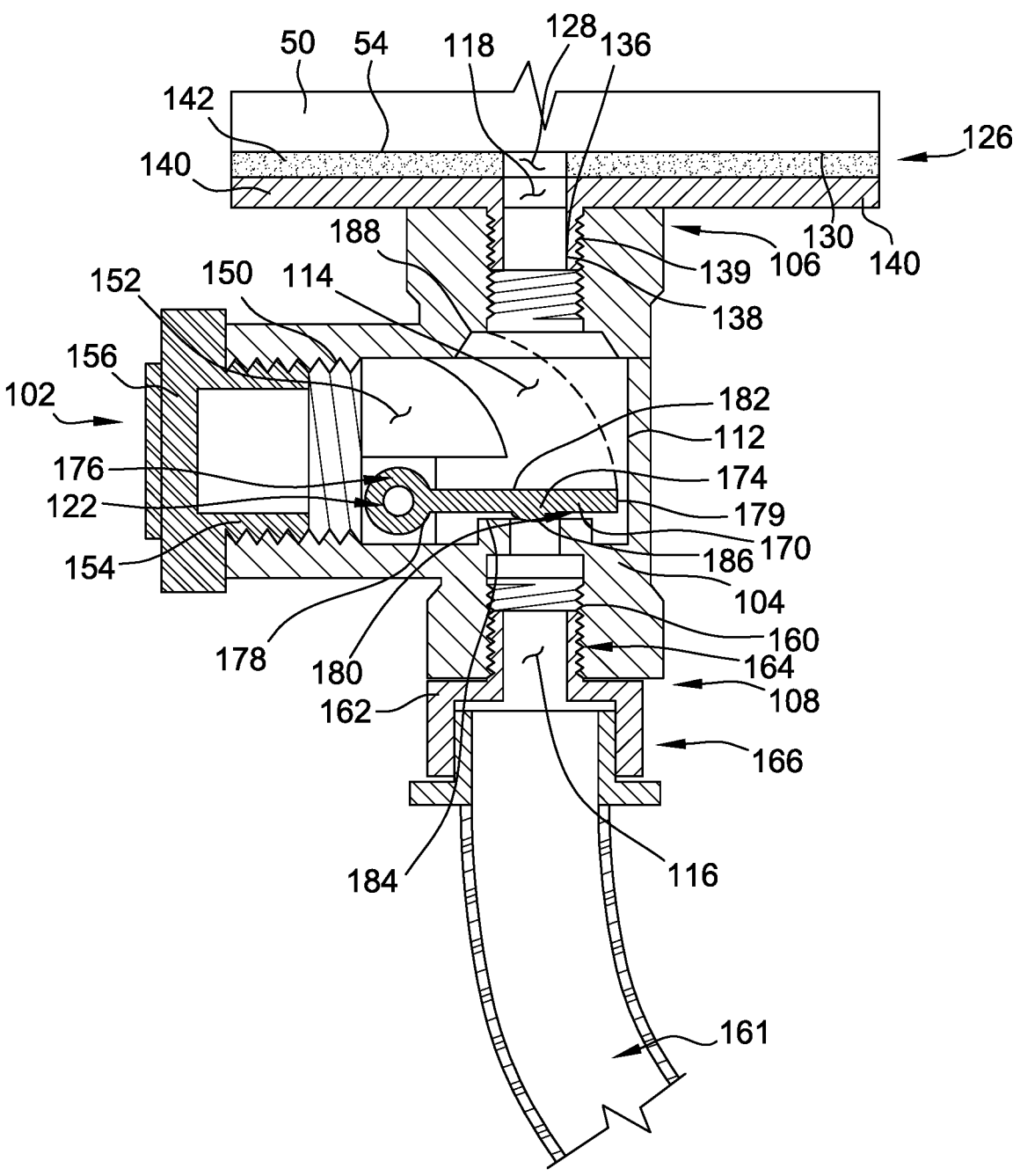
FIG. 8 is a cross-sectional view of another embodiment of a flow regulator assembly for use with the flow regulation system shown in FIG. 1 with a flow control device shown in a closed position and the flow regulator assembly fluidically connected to a hose.

In some embodiments, the main passage 114 may include internal and/or external threads 160, e.g., near the drill end 108 of the flow regulator assembly 102 such that the device 161, e.g., a pump and/or a hose, may be connected to the main passage 114. In some embodiments, the flow regulator assembly 102 may include an adaptor 162 having a flow regulator assembly end 164 that is sized and shaped to engage with the flow regulator assembly 102, and a second end 166 that is sized and shaped to engage with the device 161, e.g., a hose. See FIG. 8. The flow regulator assembly end 164 may include internal and/or external threads that are sized and shaped to engage with the threads 160 of the main passage 114, for example. In some embodiments, the adaptor 162 may be a quick coupler that allows a press fit connection.

In some cases, fluid exiting the pipe 50 does not move through the main passage 114, e.g., for example, a pump, attached to the main passage 114 and/or the secondary passage 152, may be used to inject compressed air and/or inject another fluid, to move the fluid contained within the pipe 50. The injected compressed air may eject the fluid contained within the pipe 50 out of another opening formed in the pipe 50, for example.

The flow control device 122 includes a cover 170 that selectively controls fluid flowing through the main passage 114. For example, the cover 170 may prevent, allow, and/or impede, the flow of a fluid through the main passage 114. In some embodiments, the cover 170 may be a plunger 172, see FIGS. 2-6E, in some other embodiments, the cover 170 may be a valve 174, see FIGS. 7-9. The cover 170 may be selectively positionable in at least two different positions, an open position, and a closed position. In some embodiments, the cover 170 may be positioned in a partially open position, e.g., proving enough space in the main passage 114 for the drill bit to extend all the way through the main passage 114 to form the shell opening 64 in the pipe 50, while the cover 170 blocks at least a portion of the main passage 114. Accordingly, in the partially open position, the cover 170 controls the flow of fluid through the main passage 114 while the shell opening 64 is being formed by the drill bit. Additionally, and/or alternatively, at least a portion of the tool 62 may block at least a portion of the main passage 114. In some embodiments, the cover 170 may be retained in the partially open position using When the cover 170 is in the closed position, the cover 170 blocks the main passage 114 preventing fluid from moving between the pipe end 106 and the drill end 108. When the cover 170 is in the open position, the cover 170 does not block the main passage 114, allowing fluid to move through the main passage 114 between the pipe end 106 and the drill end 108. The flow control device 122 may also include a biasing element 176 that is connected to the cover 170 which moves the cover 170 between the open position and the closed position. In some embodiments, the tool 62 moves the cover 170 into the open position. For example, the tool 62 is moved through the main passage 114, the tool 62 may contact the cover 170 moving the cover 170 against the biasing force of the biasing element 176, compressing the biasing element 176 and moving the cover 170 out of the main passage 114 or moving the cover 170 such that at least a portion of the main passage 114 is not obstructed by the cover 170.

In reference to FIGS. 6A-9, the valve 174 includes a first end 178 that is rotationally connected to the body 104 and a second end 179, e.g., a free end, which rotates about the first end 178. The biasing element 176, e.g., a torsional spring, rotates the valve 174 from the open position to the closed position. The valve 174 may include a first valve surface 180, extending between the first end 178 and the second end 179, and an opposing second valve surface 182. The first valve surface 180 and the second valve surface 182 may be planar defined by a circular boundary.

In the closed position, the valve 174 is rotated such that the valve 174 substantially blocks the main passage 114. In some embodiments, in the closed position, the valve 174 is rotated such that the first and/or second surfaces 180, 182 are arranged generally perpendicular to the axial direction and/or perpendicular to a flow direction of fluid moving through the main passage 114. When the valve 174 is in the closed position, at least a portion of the first surface 180 may be in contact with the body 104, for example the first inner surface 112 of the body 104, and/or a first retaining surface 184. The first retaining surface 184 may include an annular surface that surrounds the main passage 114. In some other embodiments, the first retaining surface 184 may be any suitable shape that may contact the valve 174 restricting the rotational position of the valve 174. In some other embodiments, in the closed position, the valve 174 is rotated such that the first surface 180 is arranged at an angle, relative to the axial direction, and/or relative to a flow direction of the main passage 114. For example, in the closed position, the first surface 180 is in contact with the first retaining surface 184 and the first retaining surface 184 is angled relative to the axial direction. See FIG. 10.

In some embodiments, the valve 174 includes a valve gasket 186 that extends from the first surface 180. When the valve 174 is arranged in the closed position, the valve gasket 186 may extend into the main passage 114, forming a seal between the valve 174 and the first inner surface 112 and/or the first retaining surface 184, e.g., the valve gasket 186 prevents fluid from leaking between the valve 174 and the first inner surface 112 and/or the first retaining surface 184. In some embodiments, the valve gasket 186 may be domed shaped, as illustrated, for example, in FIGS. 8-9. In some other embodiments, the valve gasket 186 may be wedge shaped, as illustrated, for example, in FIG. 7.

In the open position, the valve 174 is rotated such that the first and/or second surfaces 180, 182 are generally parallel to the axial direction. In the open position, the second surface 182 is in contact with a second retaining surface 188. The second retaining surface 188 may be parallel to the axial direction. See FIGS. 6-7. In the open position, at least a portion of the second surface 182 may be in contact with the body 104, for example the first inner surface 112 of the body 104, and/or a second retaining surface 188. The second retaining surface 188 may be formed in the first inner surface 112 of the main passage 114. In some other embodiments, the second retaining surface 188 may be any suitable shape that may contact the valve 174, restricting the valve 174 from rotating further.

In some embodiments, at least a portion of the valve 174 may be disposed within the secondary passage 152. For example, the first end of the valve 174, and/or a portion of the biasing element 176 is positioned within the secondary passage 152. In some embodiments, when the flow control device 122 is in the open position, the valve 174 is at least partially disposed within the secondary passage 152. The second retaining surface 188 may be formed on the second inner surface such that when the flow control device 122 is arranged in the open position, the second retaining surface restricts the rotation of the valve 174 preventing the valve 174 from rotating further into the secondary passage 152.

The biasing element 176 rotates the valve 174 in a first direction towards the closed position. To rotate the valve 174 in the opposite rotational direction, towards the open position, a tool 62 extending through the main passage 114 may press against the valve 174, e.g., the first surface 180 and/or the valve gasket 186, to rotate the valve 174 against the biasing element 176. In some embodiments, the flow control device 122 may be retained in the open position by the tool 62 and/or a retaining mechanism. In some embodiments, the flow control device 122 may be retained in the open position using a pin (not shown) that is selectively engaged with the valve 174 and/or the biasing element 176. For example, in some embodiments, the flow regulator assembly 102 includes a locking pin connected to the body 104 which may be positioned by a user in either a locked configuration or an unlocked configuration. In the locked configuration, the pin restricts movement of the valve 174 and in the unlocked configuration the pin does not restrict the movement of the valve 174. Additionally, and/or alternatively, the pin may restrict the biasing element 176 from compressing or decompressing. In some embodiments, the pin may be rotationally engaged with the body 104, allowing a user to rotate the pin to position the pin in either the locked configuration or the unlocked configuration. In some other embodiments, the pin may be translationally engaged with the body 104, allowing a user to push or pull the pin to position the pin in either the locked configuration or the unlocked configuration. The biasing element 176 may automatically rotate the valve 174 into the closed position after the tool 62 is retracted out of the main passage 114. For example, the operator merely needs to move the tool 62 out of the way of the valve 174, and the valve 174 will automatically, and rapidly (e.g., within 1 second), move the valve 174 into the closed position.

Figure 4:
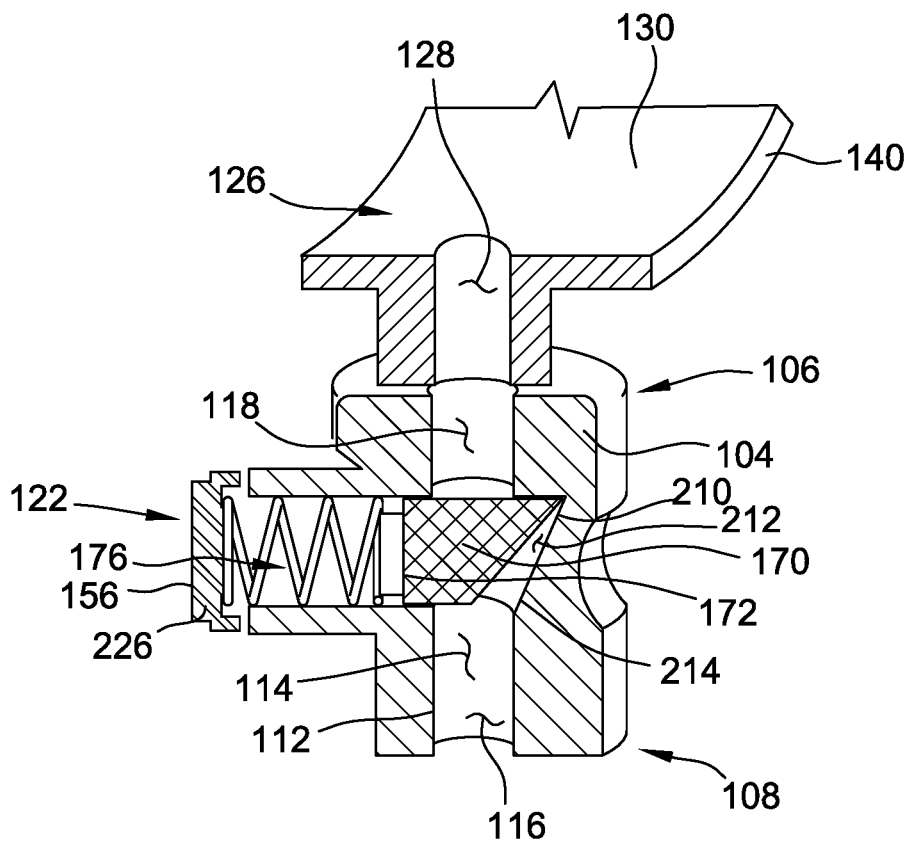
FIG. 4 is a cross-sectional view of the flow regulator assembly shown in FIG. 2 with the flow control device arranged in a closed position.

In reference to FIGS. 2-5B, the plunger 172 includes a body 190 that extends between a first end 192 and a second end 194, wherein the first end 192 is connected to the biasing element 176. The biasing element 176, e.g., a spring, moves the plunger 172 from the open position where the plunger 172 does not block the main passage 114 to the closed position where the plunger 172 blocks the main passage 114. The biasing element 176 may move, e.g., translate, the plunger 172 relative to the body 104 to position the flow control device 122 from the open position to the closed position. The plunger 172 may translate, relative to the body 104, in a direction that is substantially perpendicular to the axial direction and/or the main passage 114. Alternatively, the plunger 172 may translate, relative to the body 104, in a direction that is angled relative to the axial direction and/or the main passage 114. FIG. 2 shows the plunger 172 in the open position, with the biasing element 176 in a compressed configuration, and FIG. 4 shows the plunger 172 in the closed position, with the biasing element 176 in a less compressed configuration, as compared with the open position.

In some embodiments, the flow control device 122 is at least partially disposed within the secondary passage 152, e.g., the biasing element 176 and/or at least a portion of the plunger 172 is disposed within the secondary passage 152. For example, the plunger 172 may be disposed within the secondary passage 152 when the flow control device 122 is in the open position. In some embodiments, the plunger 172 may be completely disposed within the secondary passage 152 when in the open position. When the flow control device 122 is in the closed position, the plunger 172 extends outwards from the secondary passage 152 and across the main passage 114, substantially blocking the main passage 114.

The plunger 172 may be wedge shaped, having a lower angled surface 198. The lower angled surface may be accessible through the main passage 114, when the plunger 172 is in the closed position. When a tool 62 is moved through the main passage 114, e.g., through the first opening 116, the tool 62 may come into contact with the lower angled surface 198, such that the tool 62 presses the plunger 172 against the biasing force and moves the plunger 172 into the open position. For example, the tool 62 may press against the lower angled surface 198, causing the plunger 172 to translate, in a direction perpendicular to the axial direction, and/or the main passage 114, moving the plunger 172 into the secondary passage 152 and compressing the biasing element 176.

Figure 6A:
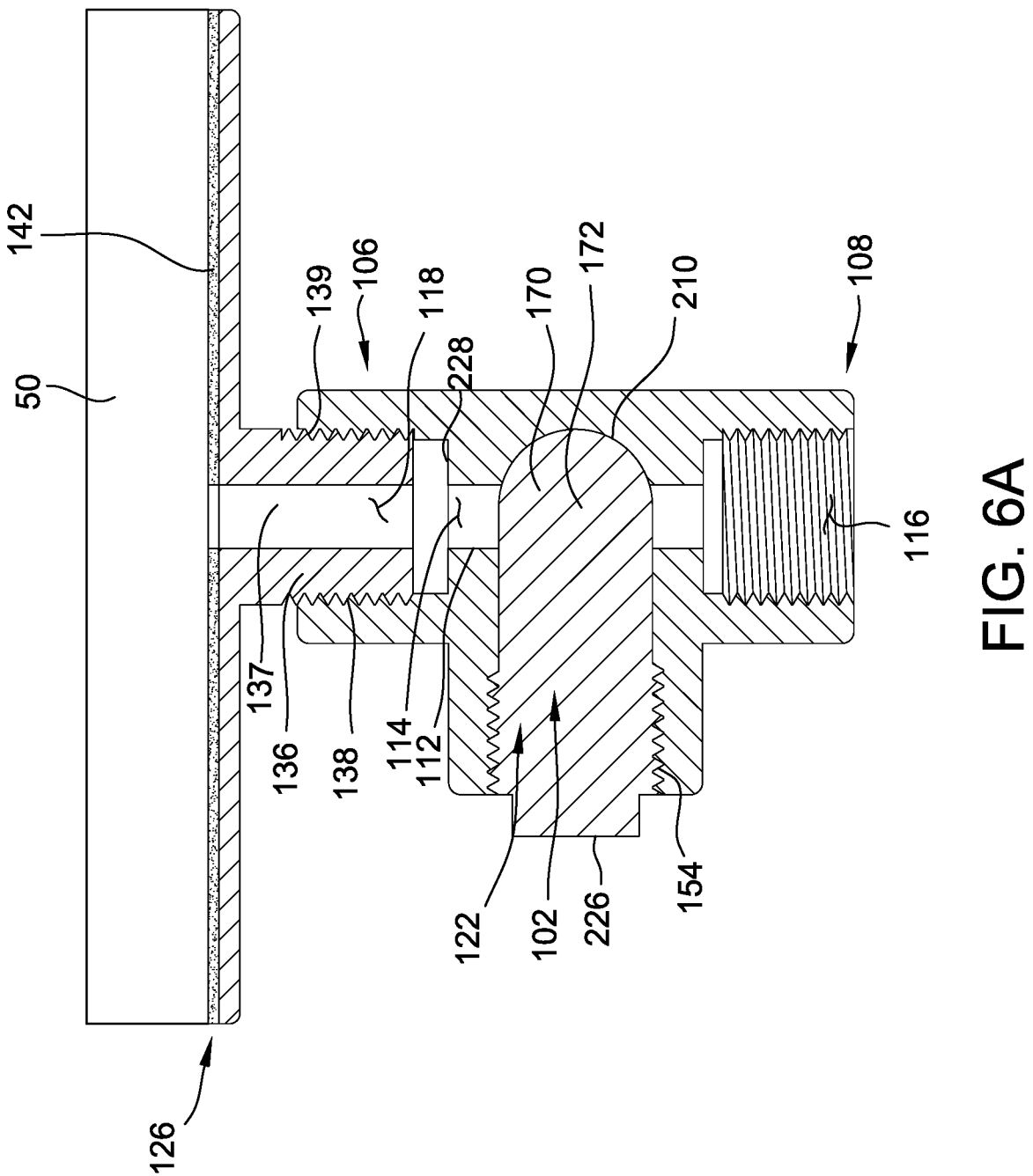
FIG. 6A is a cross-sectional view of another embodiment of a flow regulator assembly for use with the flow regulation system shown in FIG. 1 with a flow control device shown in a closed position.
Figure 6B:
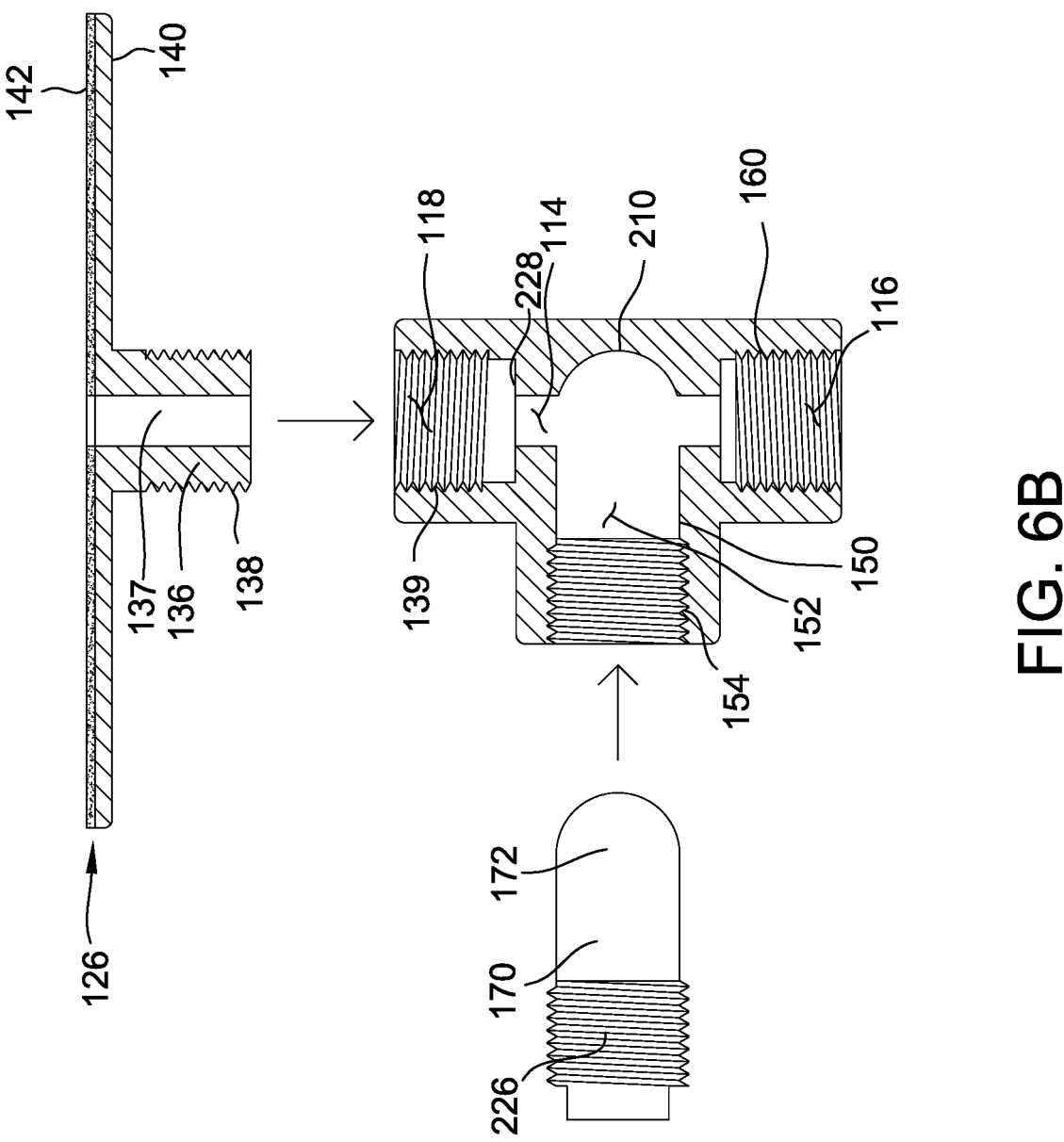
FIG. 6B is an assembly cross-sectional view of the flow regulator shown in FIG. 6A.
Figure 6C:
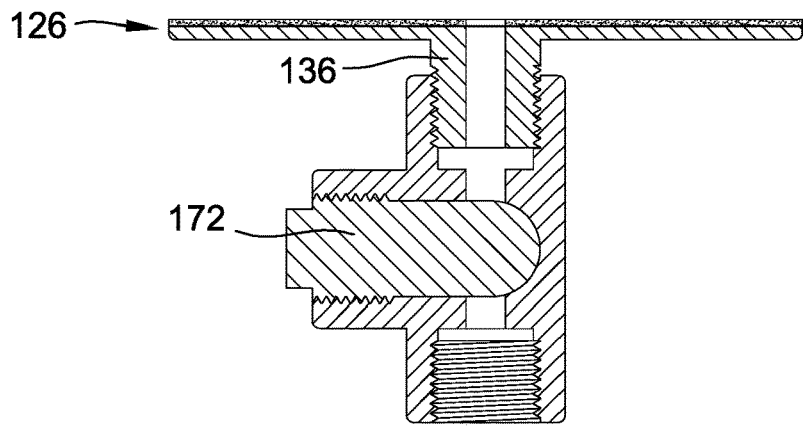
FIG. 6C is a cross-sectional view of the flow regulator shown in FIG. 6A with a flow control device shown in a closed position.
Figure 6D:
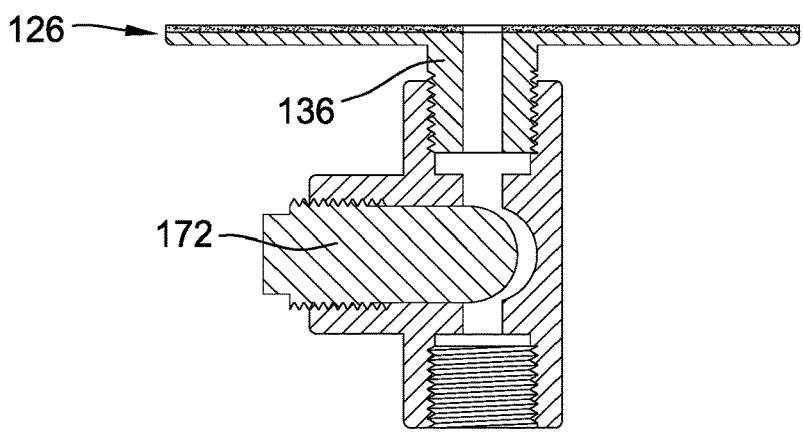
FIG. 6D is a cross-sectional view of the flow regulator shown in FIG. 6A with a flow control device shown in a partially open position.
Figure 6E:
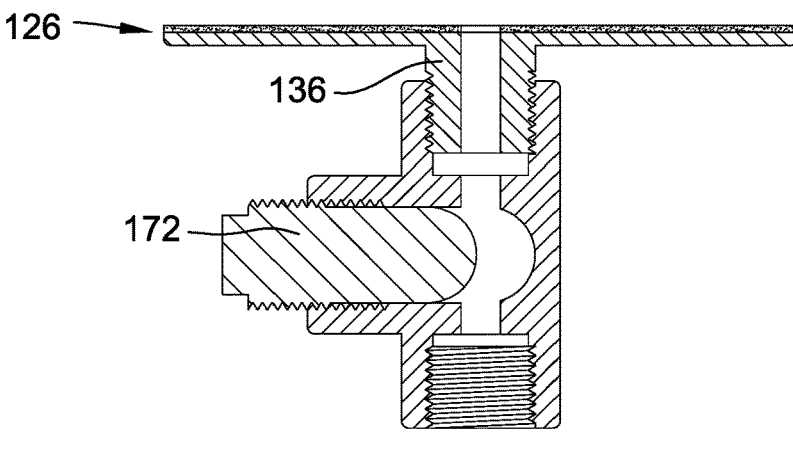
FIG. 6E is a cross-sectional view of the flow regulator shown in FIG. 6A with a flow control device shown in another partially open position.

In reference to FIGS. 6A-6E, in some embodiments, the plunger 172 may be dome shaped. The recess wall 210 defining a recess 212 may be shaped complementary to the dome shaped plunger 172. For example, the recess wall 210 may be concaved to receive at least a portion of the dome shaped plunger 172 therein, when the plunger 172 is in the closed position. In the embodiment shown in FIG. 6, the plunger 172 may be moved between the open position and the closed position using a threaded adjustment mechanism 226 that is threadably engaged with threads 154 formed on the secondary passage 152. For example, a user may turn a knob or a distal end of the adjustment mechanism 226 to rotate the adjustment mechanism 226 and the plunger 172 while engaging the threads 154 causing the plunger 172 to translate through the secondary passageway 152 and across the main passage 114. The user may rotate the adjustment mechanism 226 in the opposite direction to retract the plunger 172 from the main passage 114 and back through the secondary passageway 152. In another example, a user may turn a knob connected to the threaded adjustment mechanism 226 in order to compress or decompress the biasing element 176 thereby moving the dome shaped plunger 172 to the closed position, the open position, and/or a partially open position. FIGS. 6D and 6E show the plunger 172 in two different partially open positions. The main passageway 114 may include one or more surfaces 228 that restricts the threaded insertion of the neck 136 into the main passageway 114.

In some embodiments, when the plunger 172 is in the open position, at least a portion of the plunger 172 surrounds the tool 62, and the plunger 172 blocks at least a portion of the main passage 114. In reference to FIG. 3, the body 190 may include one or more grooves 200 defining a drill bit passage 202. The groove 200 may be sized and shaped such that the drill bit passage 202 may receive at least a portion of the tool 62 therein, when the plunger 172 is in the open position. For example, the tool 62 may be disposed within the drill bit passage 202 during a drilling operation. For example, the groove 200 may be arched and/or rounded such that a generally cylindrical tool 62 may fit snugly, e.g., with limited or minimal clearance, within the drill bit passage 202. For example, the tool 62 may be passed through the main passage 114 and the tool 62, e.g., a tip of the tool 62, may come into contact with the plunger 172, e.g., the lower angled surface 198, pushing the plunger 172 against the force of the biasing element 176, and the tool 62 will slide along the lower angled surface until the tool 62 locates within the drill bit passage 202. In some embodiments, the plunger includes a connector 204, e.g., a hook or a loop, which may connect to the biasing element 176. The connector 204 may be attached to the first end 192 of the body 190, and/or formed integrally with the body 190.

Accordingly, in embodiments described herein, the open position may be in reference to a partially open position in which the plunger 172 includes the drill bit passage 202, allowing a drilling operation to be performed, while the plunger 172 blocks at least a portion of the main passage 114. For example, contact between the tool 62 and the groove 200 retains the position of the plunger 172 in the open position and/or partially open position. The groove 200 may be coated and/or formed of a material with suitable wear and/or friction properties, such that wear between the rotating tool 62 and the groove 200 is minimal. For example, the groove 200 may be coated with Teflon.

In the partially open position, the tool 62 punctures the pipe 50, while forming the shell opening 64, allowing fluid to begin to drain from the pipe 50. The plunger 172, at least partially blocking the main passage 114, controls the flow of fluid through the main passage 114 while the drilling operation is being performed. After the shell opening 64 is formed, the tool 62 may be pulled out of the main passage 114 and through the drill bit passage 202, such that the tool 62 is no longer in contact with the plunger 172. The biasing element 176, which was retained in a compressed state while the plunger 172 was in the open and/or partially open position, now forces the plunger 172 into the closed position. The biasing element 176 may automatically position the plunger 172 into the closed position after the tool 62 is retracted out of the main passage 114. For example, the operator merely needs to move the tool 62 out of the way of the plunger 172, and the plunger 172 will automatically, and rapidly (e.g., within 1 second), move the plunger 172 into the closed position. In some embodiments, the body 104 includes a recess wall 210 defining a recess 212 that may be arranged in alignment, e.g., horizontally, from the secondary passage 152. When the flow control device 122 is arranged in the closed position, the plunger 172 may extend across the main passage 114 and at least a portion of the plunger 172 may be disposed within the recess 212. The recess 212 may be shaped complementary to the plunger 172. For example, the plunger 172 may be wedge shaped having the lower angled surface 198. The recess wall 210 may include a lower angled wall 214 that is shaped complementary to the lowered angled surface 198, such that the recess 212 is sized and shaped to receive at least a portion of the plunger 172 within the recess 212. In some embodiments, in the closed position, the plunger 172 extends between the secondary passage 152 and the recess 212, such that the plunger 172 is supported in the axial direction by both the second inner surface 150, the recess wall 210 and/or the lower angled wall 214.

Figure 5A:
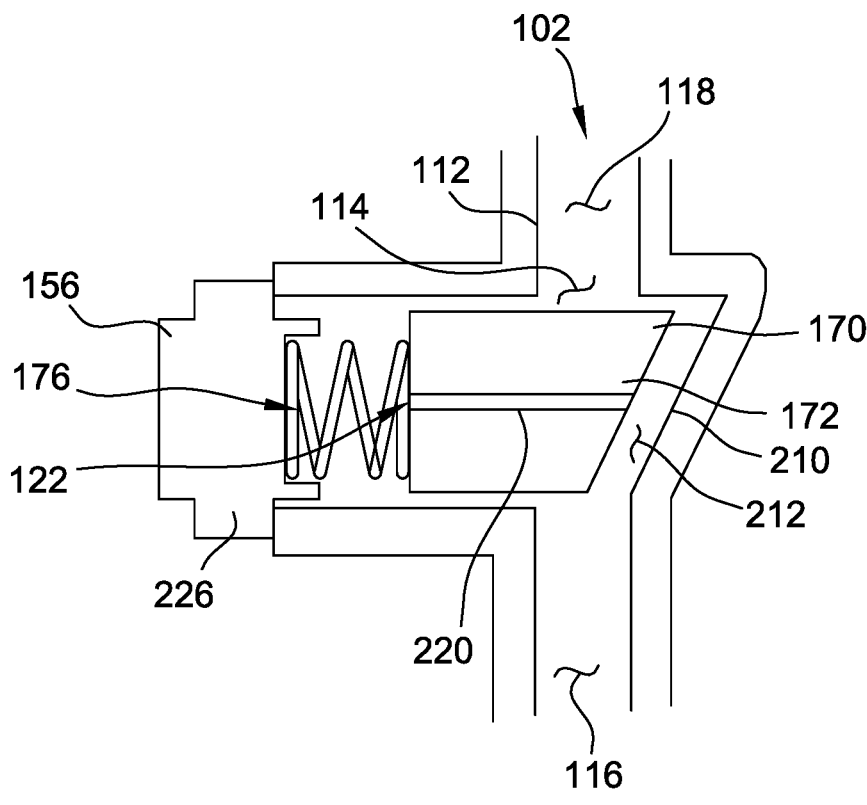
FIG. 5A is a detailed cross-sectional view of another embodiment of a flow control device for use with the flow regulator assembly shown in FIG. 2.
Figure 5B:
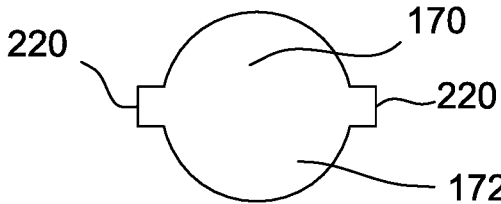
FIG. 5B is a front view of another embodiment of a plunger of the flow control device shown in FIG. 5A.

In reference to FIGS. 5A and 5B, in some embodiments, the plunger 172 may include one or more rails 220, e.g., a pair of rails 220, that extend outward from the body 190 and the body 104 may include one or more channels, not shown, that are sized and shaped to receive the rails 220 therein. The engagement between the rails 220 and the channels maintains the translational motion and alignment of the plunger 172 relative to the body 104.

In some embodiments, the flow regulator assembly 102 may include a cover adjustment mechanism 226, e.g., a knob and/or a button, which may be used to selectively position the flow control device 122 in either the open or closed position. In some embodiments, the adjustment mechanism 226 may be cap 156. The adjustment mechanism 226 may be connected to the biasing element 176, allowing an operator to selectively compress and/or decompress the biasing element 176 in order to move the cover 170, e.g., the valve 174 and/or the plunger 172, into the open position, the closed position, and/or the partially open position. For example, the cover adjustment mechanism 226 may include a button connected to the biasing element 176. An operator may pull the button to compress the biasing element and move the plunger 172 into an open position and/or a partially open position. The button may include a retaining mechanism that retains the plunger in the open position and retains the biasing element 176 in compression. Additionally, and/or alternatively, the operator may press the button again to release the biasing element 176 from compression allowing the biasing element 176 to move the plunger into the closed position.

In some embodiments, the biasing element 176 may be a friction pin (not shown). In embodiments wherein the biasing element 176 is a friction pin, the cover 170 may be selectively positionable, in the open, closed, or partially open position, using the friction pin. For example, in some embodiments, the friction pin may include a knob that is accessible to a user enabling the user to selectively move the friction pin, thereby adjusting the placement of the cover 170. For example, the user may adjust the position of the friction pin in order to position the cover 170 in the open position, the closed position, and/or the partially open position, by rotating the friction pin.

The flow control device 122 may include any suitable valve, e.g., a globe valve or a gait valve, etc., that may be used to control the flow of fluid through the main passage 114. In some embodiments, the flow control device 122 may be actuated between the open and closed positions. For example, the biasing element 176 is an actuator, e.g., an electric actuator.

Figure 9A:
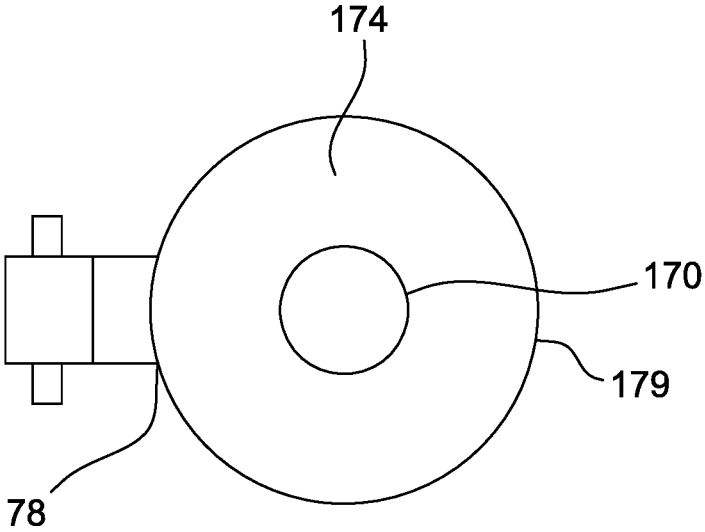
FIG. 9A is a detailed top view of a valve for use with the flow regulator assembly shown in FIGS. 6 or FIG. 7.
Figure 9B:
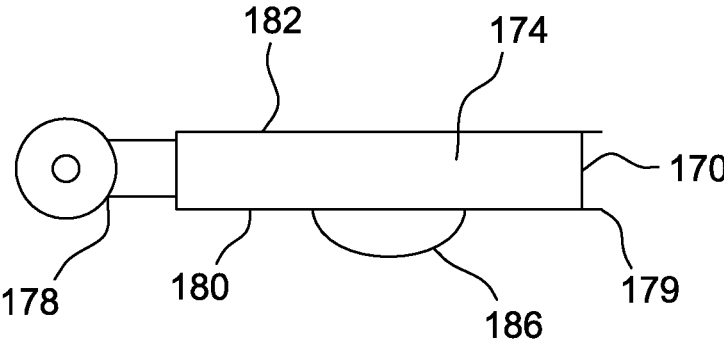
FIG. 9B is a detailed side view of the valve shown in FIG. 9A.

Referring to FIG. 9, a method 500 of draining a fluid from an opening in a wall of a pipe 50 is provided. The method 500 includes providing 502 a flow regulator assembly 102, e.g., the flow regulator assembly 102. The method 500 may include forming, and/or assembling, the flow regulator assembly 102. For example, in some embodiments, the method 500 includes selecting a suitable interface assembly 126 having one or more contact surfaces 130 that are shaped complementary to the exterior surface 54 of the pipe 50. In some embodiments, the method 500 includes attaching the interface assembly 126 to the body 104. The interface assembly 126 may include a neck 136 and the neck 136 may be inserted into the second opening 118 of the main passage 114. In some embodiments, the neck 136 has external threads 138 that may be threadably engaged with internal threads 139 formed near the second opening 118 of the main passage 114. In some alternative embodiments, internal threads 139 are formed over the entire length of the main passage 114. In some embodiments, the neck 136 may thread into the main passage 114 at a depth near or adjacent the cover 170 or a top of the secondary passageway 152. The interface assembly 126 may be connected to the body 104 using any suitable connection mechanisms. The neck 136 may define a passageway 137 that is fluidically connected to the main passageway 114. In some embodiments, for example as illustrated in FIGS. 6A-6E, the first inner surface 112 may define one or more features, e.g., surfaces, that restrict the threaded insertion of the neck 136 into the main passageway 114.

The method 500 includes connecting 504 the flow regulator assembly 102 to the pipe 50, e.g., using the connector assembly 124. Connecting 504 the flow regulator assembly 102 to the pipe 50 may include pressing one or more contact surfaces 130 of the interface assembly 126 against the exterior surface 54 of the pipe 50. Contact between the interface assembly 126 and the pipe 50 may create a seal between the pipe 50 and the flow regulator assembly 102. In some embodiments, the flow regulator assembly 102 includes a gasket and a saddle 140, and the gasket may be pressed between the saddle 140 and the pipe 50, creating a seal. Connecting 504 the flow regulator assembly 102 to the pipe 50 may include connecting one or more connector assemblies to retain the position of the flow regulator assembly 102 relative to the pipe 50. For example, connecting 504 may include engaging the first fastener 144 with the mating fastener 146. Connecting 504 may include tightening the connector assembly 124 to secure the flow regulator assembly 102 with the pipe 50. Tightening may include using the one or more adjustable mechanisms 148 to adjust a size, e.g., increase and/or decrease, of the connector assembly 124.

The method 500 may include positioning 506 the flow control device 122 in an open position. Positioning 506 may include inserting a tool 62 through the main passage 114. As the drill bit passes through the main passage 114 the tool 62 contacts the cover 170, and the contact force of the drill bit moves the cover 170 to at least partially unblock the main passage 114. For example, as the tool 62 moves through the main passage 114, the tool 62 may contact the lower angled surface 198 of the plunger 172 pressing against the biasing element 176 thereby translating the plunger 172 from the closed position into an open position. In another example, as the tool 62 moves through the main passage 114, the tool 62 may contact the first surface of the valve 174 to press the valve 174 against the biasing element 176 thereby rotating the valve 174 from the closed position into an open position. In some embodiments, positioning 506 the flow control device 122 may include using the one or more adjustment mechanisms 226 to position the flow control device 122 in the open position, or partially open position, providing enough space in the main passage 114 to allow the tool 62 to extend all the way through the main passage 114 so that the tool 62 may contact the pipe 50.

The method 500 may include performing 508 a drilling operation. Performing 508 a drilling operation may include passing the tool 62 through the main passage 114 and then through the interface opening 128 in the interface assembly 126 until the tool 62 contacts the pipe 50 such that a drilling operation may be performed to form the shell opening 64. In some embodiments, at least a portion of the cover 170 may be disposed within the main passage 114 around and/or in proximity to the tool 62, during the drilling operation. For example, while the tool 62 is rotating during a drilling operation the tool 62 may be disposed within the drill bit passage 202 of the plunger 172.

After the method 500 may further include positioning 510 the flow control device 122 in the closed position. For example, after the shell opening 64 is formed, the tool 62 may be removed from the main passage 114, and upon removal of the tool 62, the cover 170 moves from the open position to the closed position. In the closed position, cover 170 substantially blocks the main passage 114. In some embodiments, positioning 510 the flow control device 122 may include using the one or more adjustment mechanisms 226 to position the flow control device 122 in the closed position. The method 500 may further include connecting 512 a device to the body 104, e.g., in alignment with the main passage 114, to facilitate removal of fluid. For example, the method 500 may include attaching a hose to the body 104. Alternatively, the method 500 may include attaching a pump to a secondary passage 152. Alternatively, the method 500 may include positioning a container to collected fluid exiting the flow regulator assembly 102. In some methods, connecting 512 includes connecting one or more devices with the secondary passage 152.

The method 500 may further include positioning 514 the flow control device 122 into the open position, allowing the fluid to flow through the main passage 114, and/or out of the first opening 116. Fluid exiting the first opening 116 may be collected by the device 161, e.g., a hose and/or a container.

Embodiments described herein facilitate draining fluid from a container, e.g., a pipe and/or conduit, by controlling the flow of fluid after and/or during a drilling operation. Embodiments described herein include a flow control device that is disposed within a main passage of the flow regulator assembly. Fluid exiting the drainage opening formed by a drilling operation flows into the main passage of the flow regulator assembly. The flow control device is positionable such that the flow control device may be selectively positioned in an open position allowing the fluid to flow through the main passage and/or selectively positioned in a closed position, preventing fluid from flowing through the main passage. The control of fluid may allow an operator to connect a device, e.g., a hose, to the flow regulator assembly to receive the fluid. In another example, an operator may position a container to collect the fluid from the flow regulator assembly. In embodiments described herein, the flow control device is automatically positioned from the open position, e.g., during a drilling operation, to the closed position, after the drilling operation, automatically preventing fluid from draining through the main passage. For example, in the open position the biasing element is positioned in a compressed configuration, and when the cover is released, the biasing element decompresses and moves the cover.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A flow regulator assembly for regulating a fluid contained within a shell, the shell having an exterior surface and a cavity storing the fluid, the flow regulator assembly comprising:

a body including a first end and an opposing second end, the body further including a first inner surface defining a main passage, a second inner surface defining a second passage, and a recess surface, including an angled wall portion, defining a recess wherein the main passage is sized to receive a tool at the first end, the tool configured to form an opening such that when the tool extends through the main passage, the tool engages the exterior surface of the shell;

a connector assembly disposed at the second end of the body and configured to connect the body to the shell, wherein the second passage is positioned at a distance from the connector assembly;

a plunger including a lower angled surface, wherein the plunger is selectively translatable relative to the second passage between an open position and a closed position, wherein when the plunger is arranged in the open position the fluid may move through the main passage, and wherein when the plunger is arranged in the closed position the plunger extends across the main passage and fluid is blocked from moving through the main passage by the plunger and at least a portion of the lower angled surface is positioned within the recess and spaced a distance from the angled wall portion, and at least a portion of the lower angled surface is accessible through the main passage to engage with the tool when the tool is received in the main passage; and a biasing element engaged by the plunger and configured to move the plunger from the open position to the closed position.

2. The flow regulator assembly of claim 1, wherein the flow regulator assembly further comprises:

an interface assembly including a contact surface that contacts the exterior surface of the shell, wherein the contact surface is shaped complementary to the exterior surface of the shell.

3. The flow regulator assembly of claim 1, wherein the flow regulator assembly further comprises:

an interface assembly including a gasket and a saddle, wherein the gasket includes a contact surface that contacts the exterior surface of the shell, wherein the contact surface is shaped complementary to the exterior surface of the shell.

4. The flow regulator assembly of claim 1, wherein the connector assembly further comprises:

a body having a first end connected to the shell and a second free end;

a first fastener connected to the second free end; and a mating fastener connected to at least one of the shell or the first end of the body of the connector assembly, wherein the mating fastener is selectively connectable to the first fastener, and wherein the body of the connector assembly may surround at least a portion of the exterior surface of the shell and connecting the first fastener with the mating fastener connects the flow regulator assembly to the shell.

5. The flow regulator assembly of claim 1, wherein the shell is a pipe having the exterior surface that is cylindrical in shape and having a radius of curvature, wherein a contact surface of the body has a radius of curvature substantially similar to the radius of curvature of the pipe.

6. The flow regulator assembly of claim 1, wherein the connector assembly further comprises:

an adjustment mechanism, wherein the adjustment mechanism selectively tightens or loosens the connector assembly around the shell.

7. The flow regulator assembly of claim 1, wherein the plunger further comprises a groove defining a drill bit passage, wherein the tool is disposed within the drill bit passage during a drilling operation.

8. A flow regulator system comprising:

a tool for forming an opening in a shell configured to contain a fluid, the shell includes an exterior surface; and a flow regulator assembly comprising:

a body including a first inner surface defining a main passage extending along an axial direction and a recess surface, including an angled wall portion, defining a recess, wherein the main passage is sized to receive the tool configured to form the opening, wherein the body is arranged such that the tool extends through the main passage along the axial direction and engages the exterior surface of the shell, and wherein a flow moves through the main passage along the axial direction; and a plunger including a lower angled surface, wherein the plunger is selectively translatable between an open position and a closed position, wherein when the plunger is arranged in the open position the fluid may move through the main passage, and wherein when the plunger is arranged in the closed position the plunger extends across the main passage and fluid is blocked from moving through the main passage by the plunger and at least a portion of the lower angled is positioned within the recess and spaced a distance from the angled wall portion and at least a portion of the lower angled surface is accessible through the main passage to be engaged by the tool when the tool is received in the main passage.

9. The flow regulator system of claim 8, wherein the flow regulator assembly further comprises:

a connector assembly for connecting the body to the shell.

10. The flow regulator system of claim 9, wherein the connector assembly further comprises:

an adjustment mechanism, wherein the adjustment mechanism selectively tightens or loosens the connector assembly around the shell.

11. The flow regulator system of claim 8, wherein the flow regulator assembly further comprises:

an interface assembly including a contact surface that contacts the exterior surface of the shell, wherein the contact surface is shaped complementary to the exterior surface of the shell.

12. The flow regulator system of claim 8, wherein the flow regulator assembly further comprises:

an interface assembly including a gasket and a saddle, wherein the gasket includes a contact surface that contacts the exterior surface of the shell, wherein the contact surface is shaped complementary to the exterior surface of the shell.

13. A method of regulating fluid contained within a shell, wherein the method comprises:

connecting a flow regulator assembly to the shell, the flow regulator assembly including a body having a first inner surface defining a main passage and a second inner surface defining a second passage, the flow regulator assembly further including a plunger including a lower angled surface, wherein the plunger is translatable relative to the second passage, wherein the plunger is positionable between a closed position and an open position, wherein when the plunger is arranged in the closed position the plunger extends across the main passage and at least a portion of the lower angled surface is positioned within a recess and spaced a distance from a surface defining the recess and at least a portion of the lower angled surface is accessible through the main passage to be engaged by a tool when the tool is received in the main passage; 5 inserting the tool through the main passage, wherein a contact between the tool and the lower angled surface translates the plunger to position the plunger in the open position;

forming an opening in the shell using the tool positioned 10 at least partially within the main passage; and translating the plunger to position the plunger in the closed position.

14. The method of claim 13, wherein the method further comprises: 15 connecting a device to the flow regulator assembly; and translating the plunger to position the plunger in the open position.

\* \* \* \* \*